(12) United States Patent
Anderson et al.

(10) Patent No.: US 9,154,607 B2
(45) Date of Patent: Oct. 6, 2015

(54) SYSTEM AND METHOD FOR CONTROLLING HANDLING OF TERMINATING A COMMUNICATION

(75) Inventors: Karen S. Anderson, Avon, IN (US);
Corey W. Wick, Plano, TX (US); Hank Edwards, Golden, CO (US); Ed Reynolds, Plano, TX (US); Christopher B. Wilson, Atlanta, GA (US); Mark L. Thoveson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 911 days.

(21) Appl. No.: 12/192,920

(22) Filed: Aug. 15, 2008

(65) Prior Publication Data

US 2010/0041386 A1   Feb. 18, 2010

(51) Int. Cl.
*H04W 4/00* (2009.01)
*H04M 1/725* (2006.01)
*H04W 4/16* (2009.01)
*H04L 29/08* (2006.01)

(52) U.S. Cl.
CPC ......... *H04M 1/72563* (2013.01); *H04L 67/306* (2013.01); *H04M 1/72525* (2013.01); *H04M 1/72566* (2013.01); *H04M 1/72572* (2013.01); *H04M 1/72577* (2013.01); *H04W 4/16* (2013.01)

(58) Field of Classification Search
USPC ................. 455/422.1, 405, 445; 342/357.59, 342/357.65
See application file for complete search history.

(56) References Cited

U.S. PATENT DOCUMENTS

| | | | |
|---|---|---|---|
| 2005/0096009 A1* | 5/2005 | Ackley | 455/405 |
| 2006/0293057 A1* | 12/2006 | Mazerski et al. | 455/445 |
| 2007/0143482 A1* | 6/2007 | Zancho | 709/227 |
| 2009/0213001 A1* | 8/2009 | Appelman et al. | 342/357.07 |

* cited by examiner

*Primary Examiner* — Shahriar Behnamian
(74) *Attorney, Agent, or Firm* — Mannava & Kang, P.C.

(57) ABSTRACT

An apparatus, system, and method for facilitating communication handing of a terminating communication, terminating or originating, at a mobile station. User preferences are entered and stored at a database. When a terminating communication is subsequently initiated, the stored preferences are accessed, and instructions are provided to the mobile station to cause communication termination in conformity with the stored preferences.

20 Claims, 3 Drawing Sheets

SYSTEM AND METHOD FOR CONTROLLING HANDLING OF TERMINATING A COMMUNICATION

The present invention relates generally to a manner by which to facilitate handling of a communication to be terminated at, or by, a wireless device, such as a cellular mobile station. More particularly, the present invention relates to an apparatus, system, and method for causing handling of the communication, such as a call or a text message, to be carried out in a manner corresponding to a preference.

A list of preferences is created and stored at a database. When a communication is subsequently to be terminated at, or by, the wireless device, the handling of the communication is carried out in conformity with the preference. Preferences are variously time-dependent, event-dependent, position-dependent, and are either recurring or occur one time.

BACKGROUND OF THE INVENTION

Mobile communications are endemic throughout modern society. For many, use of a mobile device, such as a cellular phone, is a primary means of telephonic communications. While early-generation cellular communication systems provided for voice communications and limited data communications, successor generation systems provide for increasingly, data-intensive, data communication services. The infrastructures of cellular, and cellular-like, communication systems have been installed throughout much of the populated areas of the world. And, communications by way of cellular, and other mobile communication systems, in some areas, approaches or even exceeds the use of conventional wireline, telephonic communication systems.

Mobile stations, used in a mobile communication system to communicate are typically of small physical dimensions and weights. Mobile stations are, generally, easily carried by a subscriber or other user, permitting its use, to initiate or to terminate communications at almost any time. Many useful user interface mechanisms are included in even the least-costly, low-tier mobile stations. For instance, communication-termination alerts and annunciations, in many of such devices, are able to be selected by the subscriber or other user of the mobile station. The amplitude, of the annunciation and its ring-type, e.g., and other alert-types are all often times user selectable. And, if the user is unable to receive the terminating communication, the network of the system often times include store-and-forward capabilities, such as voice mail capabilities or e-mail, or other, message storage capabilities.

While many of the conventional, mobile stations provide for multiple alert-types and other handling actions, user preferences must generally be manually entered into the mobile station by the user. The user may, e.g., elect to mute, silence, or turn-off the mobile station so that an alert of a terminating communication does not interrupt a meeting, school class, movie theatre performance, or other professional or social situation.

Many of such events are known to the user in advance, sometimes well in advance. And, the user sometimes uses a calendar application to note the events. A calendar application is implementable on, e.g., a computer work station or directly at a mobile station.

The existing need manually to enter, or otherwise provide, instructions to the mobile station to control its manner of alerting of terminating communication is sometimes problematical. The user must remember both to make the adjustment and also actually cause the adjustments to be made. Sometimes, the user fails to remember, and sometimes the user, even when remembering to make the adjustment, fails actually to make the adjustment. As a result, an alert of a terminating communication is generated in manners contrary to the user's preference.

Additionally, even if the user makes the adjustment, the user might forget to make a subsequent readjustment so that subsequent alerts are not later generated in a desired manner. And, as a result, a user might miss a terminating communication even though the user is available to receive the communication.

If a manner could be provided by which better to facilitate communication handling of a terminating communication in accordance with a user preference, improved mobile-station operation would be possible.

It is in light of this background information related to mobile stations that the significant improvements of the present invention have evolved.

SUMMARY OF THE INVENTION

The present invention, accordingly, advantageously provides an apparatus, and an associated method, for facilitating wireless-device communication handling operation of a terminating communication.

Through operation of an embodiment of the present invention, a manner is provided for communication-handling of a terminating communication, such as a call or a text message, in accordance with a preference.

In one aspect of the present invention, alert of preferences is created and stored at a database. When a communication is subsequently to be terminated at a wireless device, the handling of the communication is carried out in accordance with the preference.

Preferences that are created and stored are variously time-dependent, event-dependent, position-dependent, and relate to events that are recurring or occurring only one time.

In another aspect of the present invention, calendar entries, entered, e.g., at an Outlook™ or other calendar application together with alerting preferences are entered and stored by the user. And, the entered calendar and preference information is stored at a network database. The network database thereby maintains preference indications relating to call handling of communications terminating at the mobile station associated with the user.

In another aspect of the present invention, when a communication is subsequently initiated for termination at the mobile station of the user, the preferences are accessed, and the communication handling is carried out in accordance with the preferences. If, e.g., the terminating communication is generated when the user prefers there to be no audible alert generated, an instruction is generated at the network and provided to the mobile station to cause the alert to be carried out in an inaudible manner. And, if the preference is, for a terminating phone call to be routed instead to a voice mail, the call is routed to the voice mail location.

Because the communication handling is carried out automatically by the carrier network in conformity with the user's previously-entered information, problems associated with the user forgetting to make the adjustments manually or subsequently failing to make readjustment manually are avoided.

In these and other aspects, therefore, an apparatus, and an associated method, is provided for facilitating wireless device, communication handling operation of a terminating communication. A preference indicator is configured to indicate a communication handling preference for the terminating communication when terminated during a wireless-device condition. An instructor is configured to instruct automatic communication handling in accordance with the communication handling preference indicated by the preference indicator.

A more complete appreciation of the scope of the present invention and into the manner in which it achieves the above-noted and other improvements can be obtained by reference to the following detailed description of presently-preferred embodiments taken in connection with the accompanying drawings that are briefly summarized below, and by reference to the appended claims.

DETAILED DESCRIPTION

Figure 1:
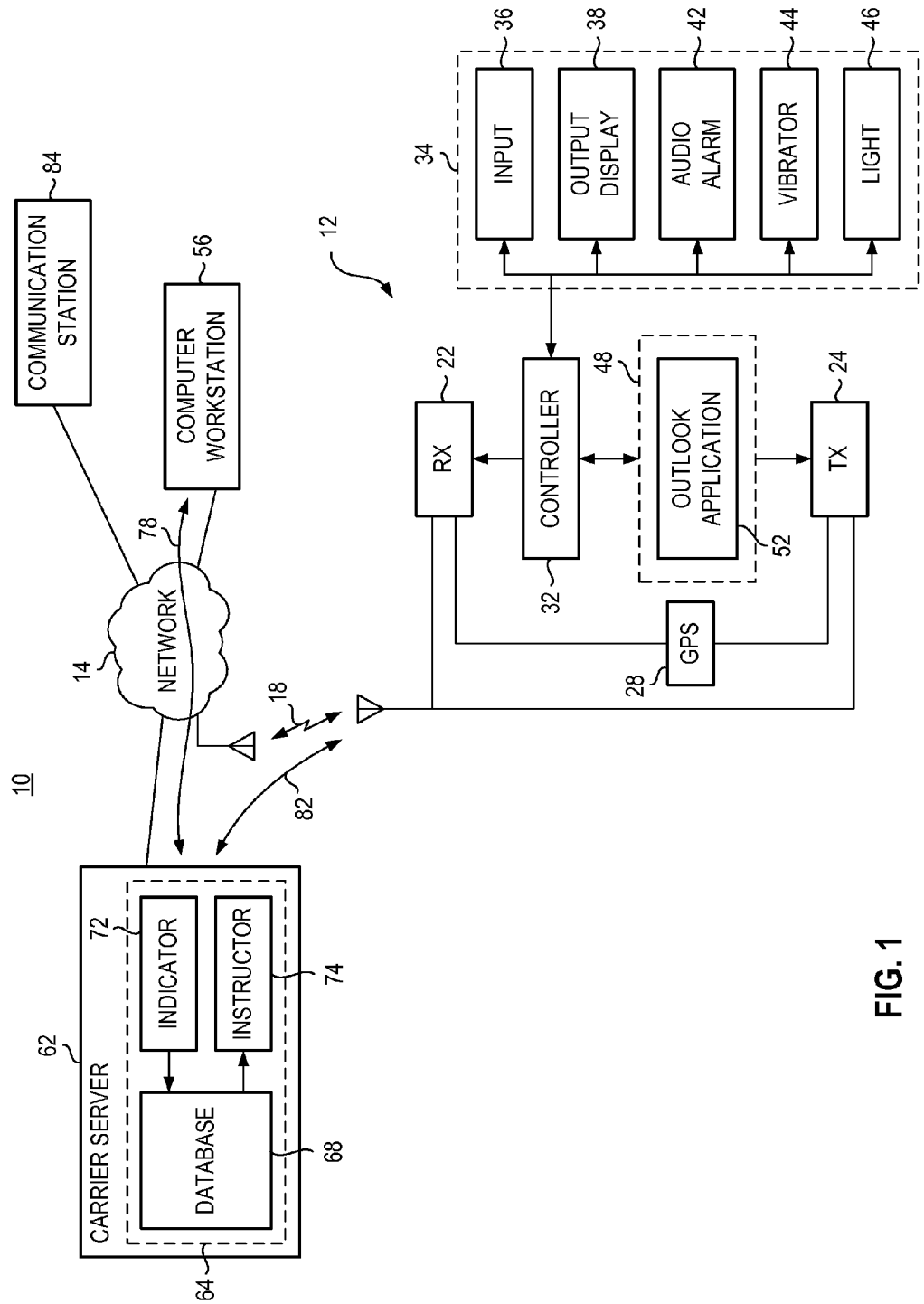
FIG. 1 illustrates a functional block diagram of an exemplary communication system in which an embodiment of the present invention is operable.

Referring first, therefore, to FIG. 1, a communication system, shown generally at 10, provides for wireless communications with a mobile station 12. In the exemplary implementation, the communication system 10 includes a cellular communication system operable in conformity with a cellular communication system standard. In other implementations, the communication system is implemented in other manners, and the mobile station operates in conformity with other types of communication standards. While the following description shall describe exemplary operation with the communication system shown in FIG. 1, it should be understood that, in other implementations, the teachings of the present invention are implemented in other types of communication systems.

The mobile station 12 communicates with a communication network 14 by way of a radio air interface represented by the arrow 18. Communication of both voice calls and data messages are provided, either originated at the mobile station or communications that are to be terminated at the mobile station. The network 14 is here representative of both a core network and a radio access network (RAN).

The mobile station includes transceiver circuitry, here represented by a receive (RX) part 22 and a transmit (TX) part 24. The mobile station here further includes a GPS (global positioning system) receiver 28 that provides positioning information identifying the position of the mobile station. In an alternate implementation, GPS-like information is obtained elsewhere and provided to the mobile station. The mobile station further includes a controller 32 that controls various functionalities of the mobile station and a user interface 34. The user interface 34 includes an input element 36 and an output display 38. The user interface further includes an audio alarm 42, a vibratory transducer 44 and a light transducer 46. The elements of the user interface are here connected to the controller 32 and their operation is controlled, or is carried out in association with, operation of the controller. A memory device 48 includes applications, here and Outlook™ application 52, or its equivalent. During operation of the controller, the Outlook application is invoked so that calendar information and preference information input by a user of the mobile station by way of the input element 36 is stored thereat. And, subsequently, information stored at the application is retrievable.

The communication system 10 further illustrates a computer work station 56. The computer work station 56 is here representative of a conventional personal computer, or the like, that the user of the mobile station 12 is also capable of accessing. The computer work station here also includes an Outlook application, or the like. The user of the mobile station is also capable, when positioned at the computer work station 56 to enter calendar information and preference information thereat.

The communication system 10 further includes a carrier server device 62 that operates in conformity with an embodiment of the present invention. In addition to conventional capabilities of the carrier server pursuant to communication activities with the mobile station, the carrier server also includes an apparatus 64 of an embodiment of the present invention. The apparatus 64 facilitates communication handling of communications to be terminated at the mobile station in conformity with the preferences of a subscriber or other user of the mobile station. The elements of the apparatus 64 are functionally represented, implementable in any desired manner, including, e.g., by algorithms executable by processing circuitry, hardware devices, and combinations thereof. Here, the apparatus 64 includes a database 68, a preference indicator 72, and an instructor 74.

In operation, preferences and/or calendar events entered by a user at either the computer work station 56 or at the mobile station 12 are provided to the preference indicator 72. The indications are provided, e.g., pursuant to synchronization operations with the computer work station 56, indicated by the segment 78 or with the mobile station, indicated by the segment 82. Synchronization operations are performed either upon instruction or automatically.

Information provided to the preference indicator is stored at the database 68. The database thereby maintains preferred, user settings and calendar information associated with the subscriber or other user of the mobile station.

When a communication is subsequently generated, e.g., by an originating communication station 84, notification of its initiation is provided to the carrier server. In addition to conventional call, or message, routing operations, the apparatus 64 of the carrier server operates in conformity with an embodiment of the present invention. The user settings and calendar information associated with the mobile station are retrieved from the database, and responsive to the retrieved contents, and instruction is generated by the instructor to instruct how to handle the communication. The generated instruction is, e.g., communicated to the mobile station to instruct the mobile station in what manner to alert the terminating communication. In the event that the communication comprises a call, and the user preference is for routing the call to voice mail, the communication is terminated at a voice mail location (not shown), and an operator at the originating communication station is permitted to leave a voice mail at the voice mail location.

Preferences set, created and stored at the database 64 are of any user selection, based upon temporal, i.e., time-based, events or are positional in nature. If positional in nature, the instructor is also provided with positional information associated with the position of the mobile station when the terminating communication is generated. For instance, user is able to elect a preference that the mobile station be operated in a silent mode, a vibratory mode, or a direct to voice mail mode, during a scheduled event. The scheduled event is either an individual event, e.g., silence during a church service the following Sunday, or pertain to recurring events, e.g., silence during church every Sunday at a particular time. Additionally, the preferences are selectively also condition-dependent. For instance, a user might prefer that the mobile station vibrate during a meeting if the user's boss is also scheduled to attend the meeting. Or, e.g., the user might prefer that the mobile station use a vibratory alert if a terminating message includes a particular keyword in the subject header. The calendar information or event information otherwise provided together with the user-selection alert, or other communication-handling preference, is determinative of the instruction generated by the instructor.

Once the event and associated preference information is entered and stored at the database, handling operations are carried automatically. When a communication is terminated at the mobile station, the audio alarm, the vibrator 44, and the light 46 are caused selectively to annunciate the terminating communication in accordance with the instructions provided by the instructor 74.

In an implementation that is positional-dependent, positional information that identifies the location of the mobile station when the terminating communication is generated is determinative of the communication handling. If, e.g., the user carrying the mobile station is positioned at a location, such as at a football or soccer stadium and the user preference is to be alerted with a loud auditory alert when positioned thereat, the instructions generated by the instructor cause the mobile station to generate a loud, audible alert when the communication is terminated at the mobile station.

In one embodiment, the network utilizes a JAIN SLEE (Java APIs for integrated networks/service logic execution environment entity) that provides for service logic execution that functions to route inbound and outbound communication events to the mobile station to implement preferences for communication handling. Based upon the established preferences, that is to say, the preferences stored at the database, the JAIN SLEE element causes the call handling to be carried out in conformity with the preference.

Figure 2:
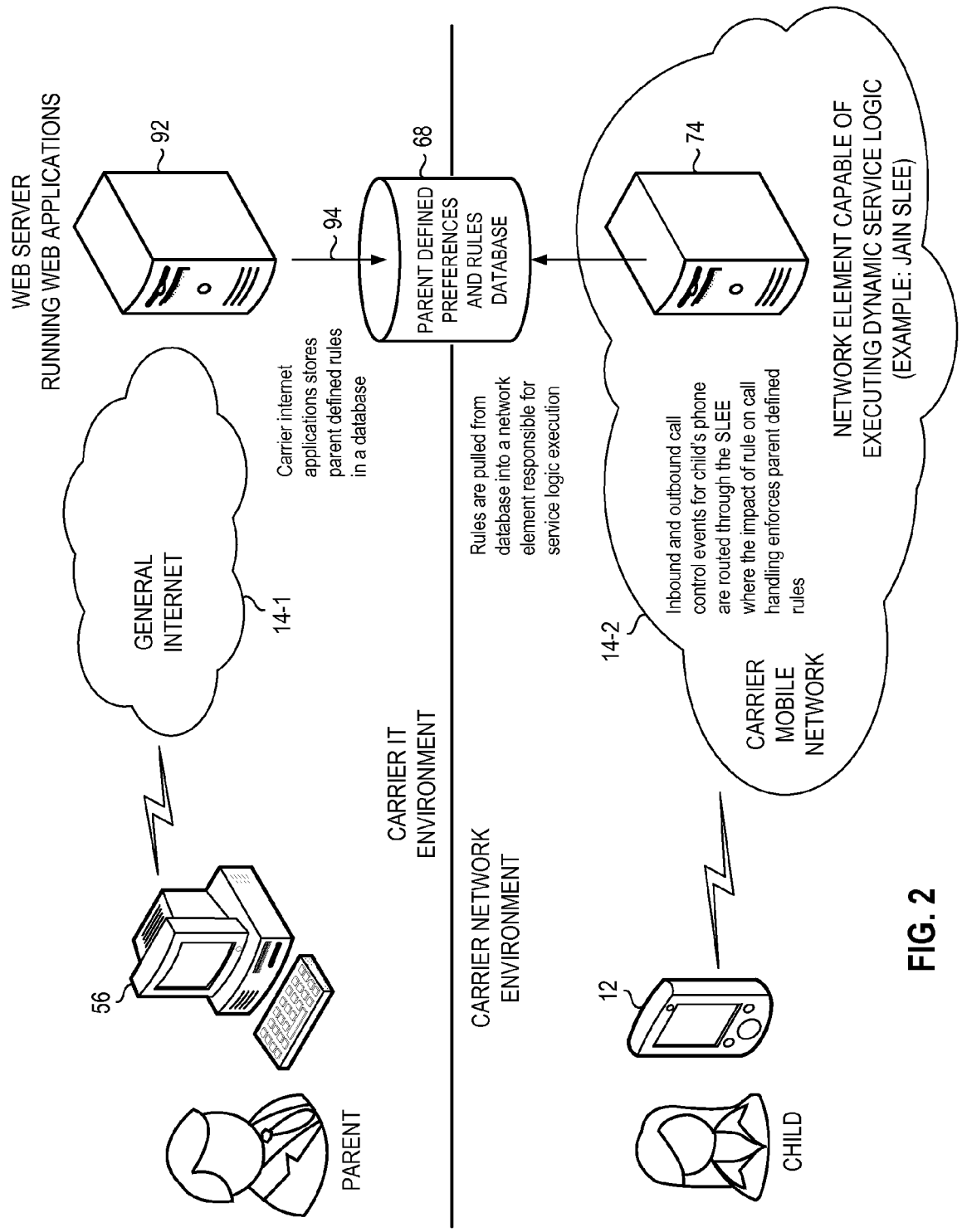
FIG. 2 illustrates a functional block diagram representative of an exemplary implementation of an embodiment of the present invention.

FIG. 2 illustrates an exemplary implementation in which a child carries the mobile station 12, and communication-handling operation of the mobile station 12 is carried in conformity with parental preferences, here entered by a parent at the computer work station 56. Here, the preferences entered by the parent at the computer work station are routed through a public network, here the internet 14-1, to a web server 92 that runs web applications. The web server is in communication connectivity, here indicated by the arrow 94, with the database 68, here at which parent-defined preferences and rules, entered by the parent are stored. Here, a JAIN SLEE element that includes the instructor 74 functionality retrieves the rules and preferences at the database 68. The element 74 is here represented to be part of a carrier mobile network, i.e., the radio access network 14-2. The element 74 causes the handling of the communications that are to be terminated at the mobile station 12 in conformity with the parent-entered preferences. For instance, inbound and outbound call control events for the mobile station 12 are determined by the parent-entered preferences. Based upon the preferences, terminating calls as well as originating calls are handled in conformity with the preferences. In one example, the parent loans the mobile station to the child. Any call that is placed to the mobile station by other than the parent, or other preferred caller, is routed automatically to voice mail. And, the child is permitted to originate calls only to the parent, or approved terminating entities. Thereby, calls that are intended for the parent are not answered by the child but rather are routed to voice mail and, the child is permitted to make calls only to the parent and other preferred persons. This example shows, therefore, that the communications governed by the functionality of an embodiment of the present invention further include those that originate at the mobile station for termination elsewhere.

Figure 3:
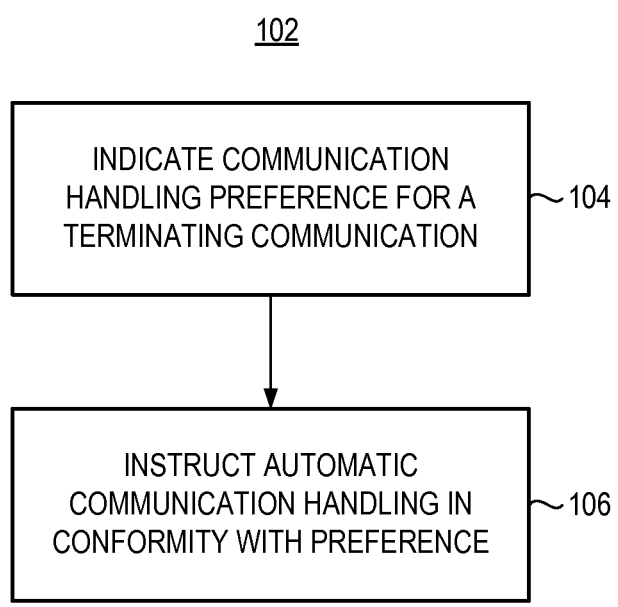
FIG. 3 illustrates a method flow diagram representative of the method of operation of an embodiment of the present invention.

FIG. 3 illustrates a method flow diagram, shown generally at 102, representative of the method of operation of an embodiment of the present invention. The method facilitates wireless-device, communication-handling operation of a terminating communication.

First, and as indicated by the block 104, a communication handling preference is indicated for the terminating communication when terminated during a wireless-device condition. Then, and as indicated by the block 106, automatic communication handling is instructed to be carried in accordance with the indicated communication handling preference.

Thereby, conventional problems associated with a user failing to adjust mobile-station, call and message handling operations during an event or failing to readjust the communication-handling operations subsequent to the event are avoided. Instead, automatic handling is carried in conformity with the user's preferences.

The previous descriptions are of preferred examples for implementing the invention, and the scope of the invention should not necessarily be limited by this description. The scope of the present invention is defined by the following claims.

What is claimed is:

1. A carrier server apparatus for facilitating wireless-device, communication-handling operation of a terminating communication intended for a wireless-device, said carrier server apparatus comprising:
   a processor; and
   a memory on which is stored machine readable instructions that cause the processor to:
      receive a communication initiation notification of the terminating communication from a communication station prior to the terminating communication reaching the wireless-device;
      determine a user-defined communication handling preference for the terminating communication when terminated during a wireless-device condition, wherein the user-defined communication handling preference comprises at least one of a temporal preference, a wireless-device positional preference, a preference to route the terminating communication to a voice-mail location, and a wireless-device annunciation preference; and
      communicate the terminating communication according to the communication handling preference.

2. The apparatus of claim 1, further comprising a preference database to store communication handling preference indications.

3. The apparatus of claim 2 wherein the communication handling preference indications comprise temporal preference indications.

4. The apparatus of claim 2 wherein the communication handling preference indications comprise wireless-device positional preference indications.

5. The apparatus of claim 2 wherein the communication handling preference indications comprise single-event occurrence preferences.

6. The apparatus of claim 2 wherein the communication handling preference indications comprise recurring-event preferences.

7. The apparatus of claim 2 wherein the communication handling preference indications comprise conditional preferences.

8. The apparatus of claim 1, further comprising a wireless-device instruction communication generator.

9. The apparatus of claim 1, wherein the communication handling preference comprises the preference to route the communication to a voice-mail location.

10. The apparatus of claim 1, wherein the communication handling preference comprises the wireless-device annunciation preference.

11. A method for facilitating wireless-device, communication-handling operation of a terminating communication in a carrier server apparatus, said method comprising:
  receiving, in the carrier server apparatus, a communication initiation notification of the terminating communication, wherein a wireless-device is a destination of the terminating communication and the communication initiation notification is received prior to delivery of the terminating communication to the wireless-device;
  determining, in the carrier server apparatus, a user-defined communication handling preference for the terminating communication when terminated during a wireless-device condition, wherein the user-defined communication handling preference comprises at least one of a temporal preference, a wireless-device positional preference, a preference to route the terminating communication to a voice-mail location, and a wireless-device annunciation preference; and
  instructing, from the carrier server apparatus, automatic communication handling, at said wireless-device, in accordance with the communication handling preference indicated during said determining.

12. The method of claim 11 further comprising storing communication handling preference indications at a preference database.

13. The method of claim 12 wherein the communication handling preference indications comprise temporal preference indications.

14. The method of claim 12 wherein the communication handling preference indications comprise wireless-device positional preference indications.

15. The method of claim 12 wherein the communication handling preference indications comprise single-event occurrence preferences.

16. The method of claim 12 wherein the communication handling preference indications comprise recurring-event preferences.

17. The method of claim 12 wherein the communication handling preference indications comprise conditional preferences.

18. The method of claim 11 wherein said instructing comprises generating a wireless-device instruction communication.

19. The method of claim 11, wherein the communication handling preference comprises the preference to route the communication to a voice-mail location.

20. The method of claim 11, wherein the communication handling preference comprises the wireless-device annunciation preference.

* * * * *